March 10, 1936.  G. K. GRAHAM  2,033,465
ELECTRICAL MEASURING MEANS AND ELECTRICALLY RESPONSIVE MEANS
Filed March 22, 1934  2 Sheets-Sheet 1

INVENTOR
George K. Graham
BY
Prindle, Bean & Mann
ATTORNEYS

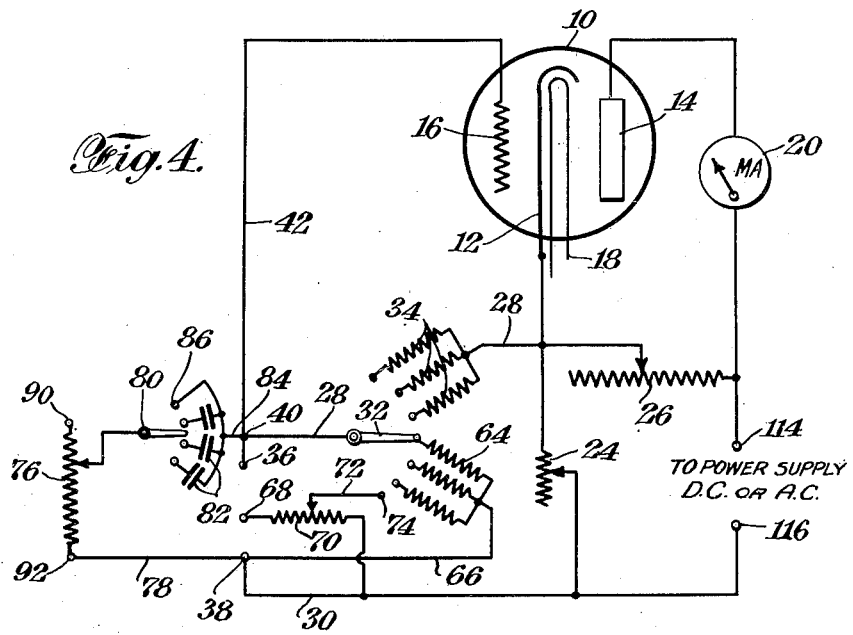
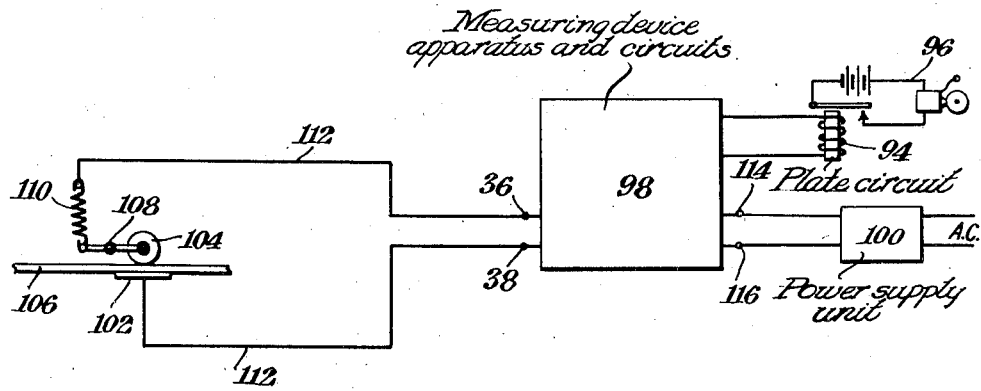

Patented Mar. 10, 1936

2,033,465

UNITED STATES PATENT OFFICE 2,033,465

ELECTRICAL MEASURING MEANS AND ELECTRICALLY RESPONSIVE MEANS

George K. Graham, Oceanside, N. Y., assignor to Paul T. Wise, trustee, New York, N. Y.

Application March 22, 1934, Serial No. 716,774

13 Claims. (Cl. 175—183)

My invention relates to an electrical measuring device adapted to measure and give direct readings of resistance, inductance, capacity and other electrical quantities such as voltage, amperage, frequency, etc. It embodies an electron tube and special circuits and means in connection therewith. It is accurate and dependable and self-corrective against inaccuracies arising from variations in the current supply and from changes in the characteristics of the electron tube. The effect of such variations is eliminated by providing means in connection with the device which enables the meter to be reset or checked as to its zero and full scale readings to suit all changes in the conditions. The device having been checked for accuracy as to its zero and maximum readings, it becomes automatically accurate as to its intermediate readings. The device is simple and easy to check as to its maximum and zero readings and after that is easy to operate.

The invention also relates more broadly to an electrically responsive device whereby changes in one or more of the aforesaid electrical quantities to any substantial or predetermined extent in connection with or in relation to the device is made operative to work a signal or to stop, start or in some other way control, modify or affect the operation of a related device or machine.

When used as a measuring device it will embody a current measuring meter such as a milliammeter or other suitable indicating instrument. When used as an electrically responsive device the ammeter will be replaced by a relay or by some other means suitable to control the related device or machine.

The embodiments of the invention herein described and shown are to be taken as illustrative of the invention but without limiting it to these forms or to all the details thereof except as required by the appended claims.

In the drawings:

Fig. 4 shows the device of Fig. 1 with additions enabling it to measure voltage, amperage, or frequency, or to be responsive to changes therein; and Fig. 5 shows an illustrative application of the electrically responsive device.

Figure 1:
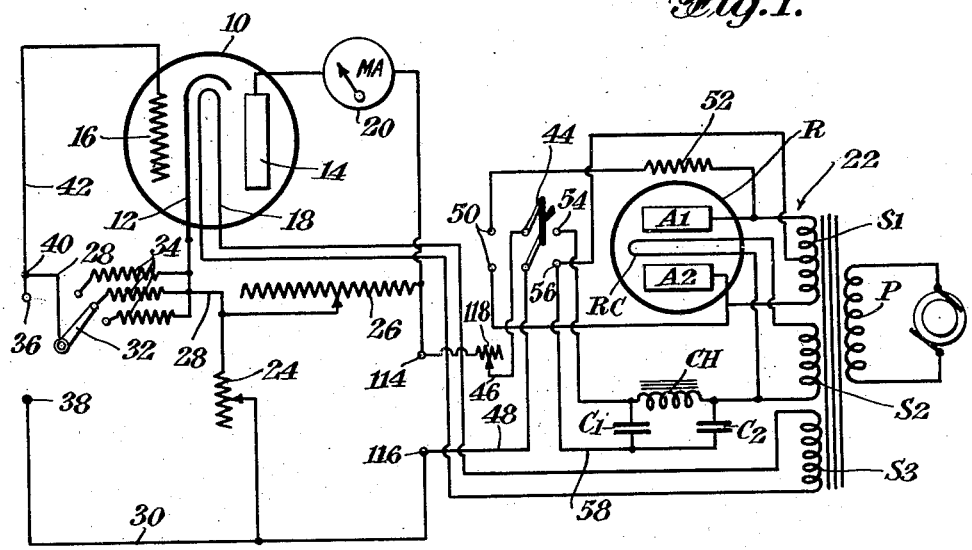
Fig. 1 shows diagrammatically an electrical measuring device and in the alternative an electrically responsive device within my invention including a form of power supply therefor.

In the drawings, 10 is an electron tube having cathode 12, plate 14, grid 16. The tube shown happens to be of the heater type, the heating filament being designated 18. The plate circuit includes the meter 20 which will ordinarily be a milliammeter, said circuit also including a power supply indicated generally by 22 and a resistor 24, the latter being connected between the cathode and the negative terminal of the power supply. The power supply may consist of any suitable source of direct current if the instrument is to be used only for measuring resistance, voltage, current, frequency, etc., or for responding to changes in resistance, etc.; but preferably the power supply will comprise as shown in Fig. 1 an alternating current supply and a rectifier combined therewith to make available both alternating current and direct current for the power-supply to the plate circuit. The range of usefulness of the instrument is thereby greatly enlarged, enabling it to measure not only resistances and the like but also inductances and capacities, etc. and to be responsive to changes therein.

Omitting for the time being further details as to the power supply unit and proceeding with the main description, 26 designates an adjustable resistor connected across the plate circuit between the positive terminal of the power supply and the cathode-end of the previously referred to resistor 24. This latter resistor 24 is also shown adjustable although in a simplified form of the instrument it may be a fixed resistor of suitable value for its intended purpose which will hereinafter appear.

Next describing the grid circuit, this consists of two electrical connections to the grid from the respective ends of the resistor 24. These connections are generally indicated at 28 and 30 respectively. Connection 28 includes a range selector switch 32 arranged for selective cooperation with standard resistors 34 of graded ohmic values. The other connection 30 includes the terminals 36 and 38 between which the unknown resistance, etc. is applied when ascertaining its value as will hereinafter appear. The two connections 28 and 30 unite at 40 with the lead 42 to the grid.

The power supply 22 shown in Fig. 1 comprises the following:—a transformer with its primary winding P connected with the alternating current mains and secondary windings S1, S2 and S3. R is a double wave rectifier tube having cathode RC and anodes A1 and A2. The secondary S2 connects with the filament or cathode RC of the rectifier tube. The secondary S3 connects with the heater 18 of the electron tube 10 previously referred to.

The anodes A1 and A2 of the rectifier tube are connected to the ends of the secondary winding S1. 44 is a double-throw double-pole switch connected into the plate circuit of the tube 10 by the leads 46 and 48, one of which includes the adjustable resistor 118. The two points 50—50 of this switch are connected by leads to the secondary winding S1, so that when the switch 44 engages these points 50, rectified current is delivered to the plate circuit of the electron tube 10. One of the leads between the secondary S1 and the point 50 of the switch includes a resistor 52 for a purpose which will hereinafter appear. The other points 54 and 56 of the switch are connected as follows: 54 is connected through choke CH to the cathode of the rectifier tube; and 56 is connected to a center tap from the secondary S1. Finally a lead 58 extends from the switch point 56 and is connected by the condensers C1 and C2 with the ends of the choke CH. The choke CH and the condensers C1 and C2 comprise a simple form of filter system.

The operation of the aforesaid double wave rectifier and filter of the power supply is briefly as follows:—

The primary P of the transformer induces suitable voltages in the secondary windings S1, S2 and S3, which then supply the connected parts. Due to the rectifying action of the rectifier tube R, whenever the alternating voltage applied to the anode A1 is positive, current flows in the tube from said anode to the cathode and thence to the filter system. Whenever the current reverses and the voltage applied to the anode A1 becomes negative, no current flows. However, during this reversal, the current applied to the other anode A2 reverses from negative to positive and current flows in the tube from that anode to the cathode and thence to the filter system. In this manner full wave rectification takes place. The resulting pulsating direct current output of the rectifier is fed to the filter system. The condenser C2 of the latter periodically stores the energy supplied to it from the rectifier and periodically discharges through the filter choke CH into the condenser C1. The filter system serves to smooth out the pulsations in the rectified current. The output of this simple filter system is sufficiently smooth direct current for ordinary accuracy in the working of the measuring device but for more accurate working a more elaborate filter system obviously may be employed. Various other methods of rectification may be used such as mechanical rectifiers, chemical, etc. Obviously a battery may be used for the power supply if the device is to be used only for direct current measurements.

Thus it will be seen that the power supply 22 is such that when the switch 44 is connected with the points 54, 56, direct current is supplied to the plate circuit of the electron tube 10 with the positive thereof connected to the plate. On the other hand, when the switch 44 is reversed and connected with the points 50, alternating current is supplied to the plate circuit.

The operation of the device to measure resistance and the like may now be described.

The switch 44 having been connected with the points 54 and 56, delivers direct current to the plate circuit of the tube 10. The cathode 12 having been heated, current flows in the plate circuit from the power supply through the meter 20 to the plate 14 and from it to the cathode 12 and thence through the resistor 24 back to the supply.

Before using the device to measure the unknown value, it is first adjusted to suit the then existing condition of the tube, etc. to make the device give full scale and zero readings respectively. This is accomplished by adjusting the resistor 26. The resistor 24 will previously have been set to have the correct operating value as will hereinafter appear, or may be a fixed resistor of the correct value.

The aforesaid adjustable resistor 26 is a relatively high resistance compared to 24 and its adjustment serves to change the potential of the cathode and grid relatively to the plate and so enables adjusting the plate current under the given conditions to give full scale reading on the meter 20. This it does by changing the voltage drop across the resistor 24 which in turn determines the difference in potential between the cathode-grid and the plate and so determines the strength of the plate current. As the voltage drop across the resistor 24 is increased, the difference in potential between the cathode-grid and plate is decreased; and vice versa.

The resistor 24 may have a predetermined fixed value or may be adjustable to have a value to produce a voltage drop such that when the terminals 36—38 are connected together, the grid is rendered sufficiently negative relatively to the cathode to cut down the plate current either actually to zero or as I prefer it, virtually to zero, which will be shown by the meter indicating either actual zero or virtual zero, as the case may be. In the latter case, the bias on the grid will be such that it allows a very small plate current to flow. For example, .01 on the scale of the milliammeter 20 may be chosen as the virtual zero at which to start the readings. The advantage of using a virtual zero in the operation of the device is that it is a positive indication that the instrument is operating, whereas if the actual zero be used this reading might appear on account of some inoperativeness. Moreover the inoperativeness would not be disclosed.

From the foregoing it will be understood that before any use of the device to measure the unknown value, it will be adjusted and tested in the two respects described, namely to make it read full scale by adjusting the resistor 26 and to make it read zero or virtual zero by momentarily connecting together the terminals 36—38, and adjusting the resistor 24 if necessary. The device is then in condition to make accurate determinations of the unknown values.

These adjustments make it possible to compensate for such variables as changes in the voltage supplied by the power mains and changes in the tubes 10 and R and any other variables.

Now to make a measurement, the unknown value is connected between the terminals 36—38. This in effect makes a potentiometer out of the unknown resistance and the standard resistance 34 connected at 40 to the grid. The voltage drop across the resistor 24 acting through the unknown and the standard resistance will give the grid an intermediate potential corresponding to the ratio between the unknown and the standard resistances. For example, if the voltage drop across the resistor 24 is 10 volts and the value of the unknown resistance is exactly equal to the value of the standard resistor then the grid 16 will have a potential of 5 volts negative relatively to the cathode 12 and the plate current will be cut down and the meter will register accordingly on its scale.

In short when an unknown value of resistance is connected between the terminals 36, 38, the grid will assume a negative potential relatively to the cathode in direct proportion to the ratio between the unknown value and the value of the selected range standard resistor 34. These changes of grid bias cause corresponding changes in the plate current as indicated by the meter; and the scale of the meter having been calibrated from a series of tests made with standard values, the result is an electrical measuring device whose meter gives a direct reading of the unknown value.

To use the instrument for measuring capacity or inductance, the switch 44 on the power supply is thrown over to the points 50 to supply alternating current to the plate circuit of the tube 10. Substantially the same action takes place as before with the exception that the readings now are readings of the capacitative reactance for example of a condenser connected across the terminals 36 and 38 or the inductive reactance of a coil connected across said terminals. These readings due to the rectifying action of the tube 10 will be at one-half the frequency of the applied alternating current from the power supply. Thus, if this be a 60 cycle current, the measurement of inductance and capacity will be in the terms of inductive reactance or capacitative reactance at 30 cycles.

Of course instead of applying the ordinary 60 cycle power-line alternating current to the power supply unit, alternating currents of other frequencies may be used. For instance a 2000 cycle per second alternating current may be applied to the plate circuit of the tube 10 whereupon the reading can be taken in terms of the capacitative or inductive reactance at 1000 cycles per second.

At this point it may be mentioned that the resistor 52 in the power supply unit has a value such that when the switch 44 is connected to the points 50 to deliver alternating current to the plate circuit, the meter is caused to give substantially the same readings as when the plate circuit is supplied with direct current by the switch 44 being connected to the points 54, 56. In other words, the resistor 52 is such that it makes the meter readings for the same unknown value interchangeable whether made with direct current or alternating current.

It will be understood that the dial of the meter will display the various scales concentrically, namely a resistance scale calibrated in ohms; an inductance scale calibrated in henrys, a capacity scale in farads, etc. The values in the resistance and inductance scales will increase in the same direction but those in the capacity scale will begin at the maximum of the other scales and have its maximum at their zero. The dial will also display scales calibrated in volts and amperes and frequencies if the device be designed to measure these quantites also.

It will be understood that the range selector switch 32 will be adjusted to connect with the standard resistance nearest in value to the unknown. The various standard resistors can be so valued that the readings on the meter will merely need the addition of the required number of ciphers to give the true reading. Thus I may calibrate the scale of the meter as 0 to 1000 ohms. Then the various standard resistors will be chosen so that the next adjacent resistor would give a scale reading of from 0 to 10,000 ohms. It is then merely necessary to add one cipher to the scale reading to get the value of the unknown when said 0 to 10,000 ohm resistor is used. This principle can be applied throughout in connection with all the standard values and the different kinds of scales wherever applicable.

Not only the quantity or value but the nature of the unknown value is determinable by this device. For example, assume that the device has been adjusted for the reading of resistance with the direct current connected to the plate circuit. The unknown value having been connected to the terminals 36 and 38, the resistance reading on the meter will be taken. Then the switch 44 will be shifted to deliver alternating current to the plate circuit as in reading capacity or inductance. If the reading on the meter increases it is an indication that the unknown is an inductance having a direct current resistance of the value first noted and an impedance of second value. If the reading decreases, it is an indication that the unknown consists of a resistance and a capacity in parallel, etc. In this way the various combinations of unknown resistance, inductance and capacity values met with in practice can be identified and determined.

It will be understood that the power supply is designed to give a voltage at 114—116 which will bring the meter 20 to full scale by an adjustment of the resistor 26 within its range of adjustment. In any particular instance, should this not be possible, then the resistor 118 can be adjusted to bring the voltage on 114—116 to such value as will accomplish said full scale reading. Indeed, 26 may be a fixed resistor, in which case the power supply resistor 118 may be relied upon to adjust the meter to get the heretofore described full scale reading; or any other suitable means may be used in connection with the power supply to provide the suitable voltage on 114—116 to give full scale reading.

Figure 2:
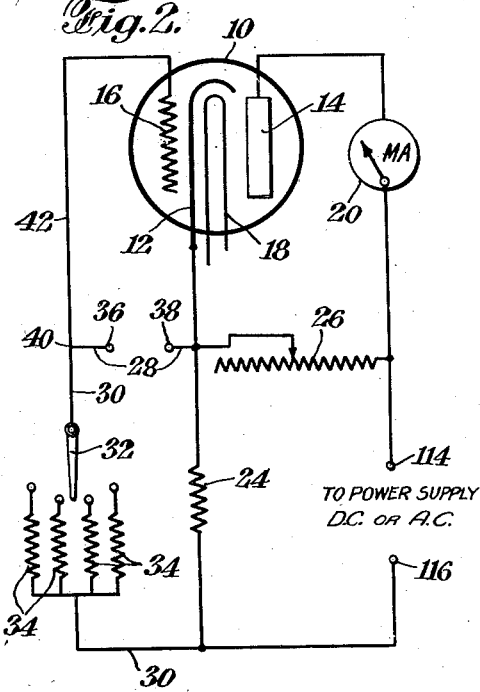
Fig. 2 shows a modification.

Fig. 2 shows a modification wherein the terminals 36, 38 for the unknown are included in the electrical connection 28; and the standard resistors are shifted to the electrical connection 30. This results in reversing the direction of the deflections of the meter 20. In the operation of the device of Fig. 2, when the terminals 36 and 38 are connected together, the meter reading is adjusted to full scale by means of the resistor 26, and when said terminals are open circuited, the meter reading falls to zero or .01 of the full scale. When the terminals 36 and 38 are open circuited, the grid assumes a negative potential with respect to the cathode so that either no current or if the virtual zero mode of operation is adopted only a very small value of plate-current such as .01 flows through the meter, thence through the electron tube and out by way of the cathode through the resistor to the negative end of the power supply. When the unknown value of resistance, etc. is inserted between the terminals 36 and 38, the grid assumes a potential that has increased in the positive direction by an amount equal to the ratio between the unknown value and the selected standard resistor. This causes an increase in the plate-current which will be the indication read from the meter.

Figure 3:
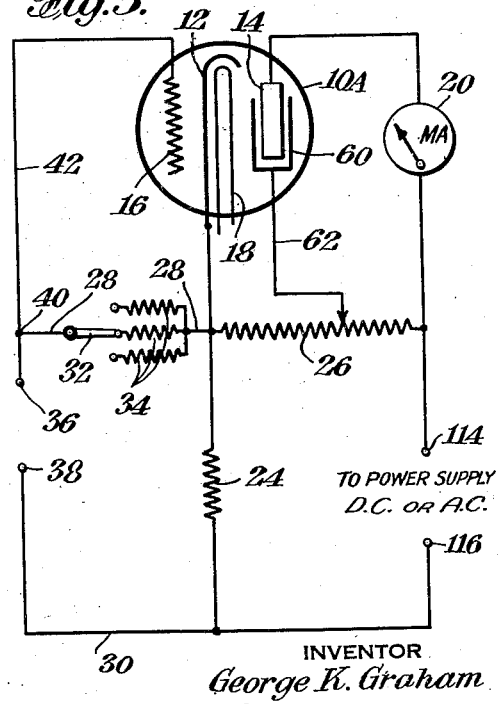
Fig. 3 shows another modification for use with a screen-grid tube.

Fig. 3 shows the device when using the screen-grid type of tube. In this circuit the potential applied to the screen 60 of the tube is obtained through the electrical connection 62 adjustable along the resistor 26. By this adjustment, the potential on the screen can be regulated to regulate the total plate-current and bring the meter to full-scale reading during the preliminary setting up of the device before measuring the unknown value. By the use of the screen grid type of tube, a greater degree of sensitivity is obtained for registering finer degrees of value.

Fig. 4 shows an addition to the device for measuring voltage and current, either alternating or direct. This addition to Fig. 1 consists of the following:—A set of standard graded resistors 64 is provided to cooperate with the switch 32. These resistors are connected by lead 66 with the terminal 38. A further addition is shown for use when needed to measure higher voltages than that permitted by the resistor 64 and consists of the following:—a third terminal 68 is associated with the other terminals 36—38, and is connected by a high resistance 70 to the lead 38. This high resistance 70 forms an element of a potentiometer whose adjustable element is connected by lead 72 with a terminal 74 associated with the group of standard resistors 64 so as to be engageable by the switch 28 when wanted for use.

The operation of the device in Fig. 4 to measure unknown voltages and current, both alternating and direct is as follows:—the meter is first adjusted as for the measurement of resistance and after the checks for accuracy have been made, namely the adjustment to full-scale and the check to zero or .01 scale, the range selector switch 28 is shifted to connect with one of the standard resistors 64, which one depending on the approximate magnitude of the unknown voltage to be measured.

The selected standard resistor 64 being now across the terminals 36—38, the grid assumes a negative potential with respect to the cathode giving zero reading on the meter as explained in the operation of the device for measuring resistance. The unknown voltage is then applied across these terminals 36, 38. If it be a direct current voltage the positive pole will be connected to the grid-connected terminal 36. This reduces the negative grid bias, in other words, makes the grid more positive by an amount equal to the difference between the drop across the resistor 24 and the unknown voltage. The grid bias being thus reduced, there is a corresponding change in the plate-current registered by the meter 20 and interpreted by a voltage scale thereon in terms of voltage.

For the measurement of alternating current voltages, the action is the same except that the voltage of every other or each alternate half cycle impresses a positive bias on the grid which determines the plate-current registrable on the scale of the meter as instantaneous peak voltages.

For the measurement of current or amperage, the range selector switch 28 is adjusted to position 64 and the current being measured is passed through the suitable resistor for the expected load and the voltage drop caused by the passage of the current through this resistor is read on the meter on a scale calibrated in terms of current or amperes.

For the measurement of relatively high voltages as for example, 1000 to 3000 volts and the like, the terminal 68 is used and the unknown voltage is applied across the potentiometer resistor 70 and a predetermined proportion, depending on the adjustment of the potentiometer contact, is fed to the terminals 36, 38 by connecting the switch 28 with the contact 74. This creates a potentiometer effect and any desired ratio of the total unknown voltage can thus be fed to the meter. This makes possible the measurement of high voltage values. By the use of suitable shunts, etc. the range of the meter can be further extended to meet the requirements.

Fig. 4 further shows added means for measuring frequencies as follows:—76 is the general designation for a potentiometer connected by lead 78 with the terminal 38. The resistance element of the potentiometer has end-terminals 90—92. The adjustable contact of the potentiometer is connected to switch 80 which latter cooperates with contacts to which condensers 82 of standard and graded values are connected. Lead 84 connects one terminal of each condenser to terminal 36. Switch contact 86 is directly connected to the lead 84 without any intervening condenser.

Frequency is measured by the device as follows: The device is set as for the measurement of voltage. The unknown-frequency current is applied to the terminals 90—92. The potentiometer 76 is then adjusted to deliver a voltage of sufficient value to cause a full-scale deflection of the meter 20. The switch 80 is then shifted to take in one of the standard condensers 82. The unknown-frequency current then must flow through the selected condenser 82, connections 84 and 28, switch 32, and the selected standard resistor 64, which reduces the reading on the meter by the value of the capacitative reactance of the condenser at the particular frequency being measured. A scale of frequencies on the meter enables this reduced reading to be read directly from the scale in terms of frequency; and this will directly indicate the frequency of the current under test. The meter will indicate higher readings on this scale, the higher the frequency. The principle upon which this measurement of frequency is based is that the capacitative reactance of a condenser varies with the frequency of the applied current.

All of the resistors and resistances in the measuring device in all of its forms should be non-inductive if the device is to be used to determine alternating current values such as impedance, inductance, etc. in order to avoid internal interference with the unknown values by the elements of the device itself. Of course the use of the device may be limited to the measurement of direct current values in which case it is immaterial whether the resistances are inductive or non-inductive.

The term zero in the claims means either actual or virtual zero on the scale of the indicating meter unless otherwise stated.

I will now describe the broader utility of the invention as an electrically responsive device to control or enable the control of another device, machine or other apparatus or means. In such case ordinarily another form of electrically responsive device will be substituted for the meter 20. Such other form of device may, for example, include a relay and some apparatus controlled by the relay as shown in Fig. 5.

The relay and the controlled device are shown in Fig. 5 which illustrates a use of the invention as an electrically responsive device to make a signal according to changes in the electrical value to which the device is sensitive.

In the particular illustration in Fig. 5 the invention is applied to indicate variations in the thickness of a strip of material.

In said Fig. 5 the rectangle 98 is intended to represent the measuring device including all the parts and circuits thereof shown in Fig. 1 with the exception of the meter 20 and the relay and bell-ringing circuit, the latter, namely, the relay and the bell circuit being shown respectively at 94 and 96 in Fig. 5.

The other rectangle in Fig. 5 designated 100 is intended to represent the power supply in Fig. 1.

In the same way the rectangle 98 in Fig. 5 may be taken as representing the embodiment of the invention shown in Fig. 2, 3 or 4, or an equivalent embodiment if and when it becomes desirable to use same as a substitute.

Fig. 5 shows the following additional parts it being understood that these may be substituted by various other means depending upon the particular kind of use to which the invention is applied. The particular use illustrated in Fig. 5 relates to indicating variations in the thickness of a strip of material; and the additional parts there shown for this purpose are as follows: 102 is a metal bar and 104 is a metal roller between which travels the strip 106 whose thickness is to be checked. The roller is supported on one end of a centrally pivoted lever 108 whose other end is acted on by the spring 110 to cause the roller to bear yieldingly against the strip. The bar and roller are electrically connected by leads 112 to the terminals 36 and 38 of the electrically responsive device 98. The material of the strip is supposed to be electrically non-conductive. The device 98 is set to be responsive to changes in electrical capacity in accordance with the description heretofore above given for measuring capacities. Any variation in the thickness of the traveling strip 106 varies the distance between the roller and the bar. These parts form plates of a condenser and varying their distance apart varies their capacity as a condenser. It will be remembered that the relay 94 is in the plate-circuit. Therefore, changes in the thickness of the traveling strip causing changes in the capacity across the terminals 36, 38 correspondingly varies the plate-current flow through the relay. Obviously the relay may be biased by a spring or in some other way so that it is operated only by a certain amount of change in the plate current and is not affected by smaller changes. Also it may be biased to operate only when the capacity decreases due to thickness-increase of the strip; and vice versa. In any event, when the relay does operate it closes the bell circuit 96 or an analogous circuit, as an indication to the attendant to mark the particular part of the strip then passing under the roller, or to stop further feed of the strip, or the relay may energize a device which will do these things automatically without the attendant.

In a device such as illustrated in Fig. 5, the element which is to operate the relay is not necessarily of an unknown value but here, as in the case where the device is to be used for measuring the element to be brought into the circuit (which may be termed an "outside" element as it is not part of the actual device), such element bears a determinable relationship to the electrically responsive device typified by the relay 94 or the meter 20.

Of course it will be understood that if desired, any suitable electron tube amplifier may be used in connection with the foregoing devices to amplify the current output thereof either in connection with the operation of an electrical meter or electrically responsive devices in general.

What I claim is:

1. In combination, an electron tube with its cathode, plate and grid; a plate circuit for said tube comprising therein a meter, a plate-circuit power supply and a resistor, the latter connected between the cathode and the negative terminal of the supply; electrical connections to the grid from the ends of said resistor, one of said connections comprising a standard resistor, and the other connection comprising terminals for the insertion of an outside element the electrical value of which is to be determined; and another resistor connected with the plate circuit, said resistors with the exception of the standard resistor having values or being adjustable to have values which enable regulation of the plate current to produce full-scale and zero plate-current readings on the meter as a preliminary to inserting and measuring the "unknown".

2. The device of claim 1 further characterized by the power supply comprising an alternating current supply and a rectified alternating current supply together with means for connecting either at will to the plate circuit, the connections for the alternating current supply including a resistor having a value enabling the meter to give the same or comparative readings for the same outside element whether the plate circuit be supplied with the rectified or unrectified alternating current.

3. In combination, an electron tube with cathode, plate and grid; a plate circuit therefor comprising an electrically responsive device, a plate-circuit power supply and a resistor, the latter connected between the cathode and the negative terminal of the supply; electrical connections to the grid from the ends of said resistor, one of said connections comprising a standard resistor and the other connection comprising terminals for an outside element the electrical value of which is to be determined; and another resistor connected between the cathode and the positive terminal of the power supply.

4. The device of claim 3 further characterized by there being means which is controlled by said electrically responsive device.

5. In combination, an electron tube with cathode plate and grid, a plate circuit therefor comprising a power supply and an electrically responsive device intermediate the plate and the power supply, means intermediate the cathode and the power supply return for maintaining a potential differential between the cathode and such power supply return, and two connections between the cathode and the grid, one including said means for maintaining a potential differential and the other not including such means, a second means for causing a potential differential in one of said connections and means whereby an outside element having an electrical value bearing a determinable relationship to said electrically responsive device may be interposed in the other of said connections.

6. In combination, an electron tube with cathode plate and grid, a plate circuit therefor comprising a power supply and an electrically responsive device intermediate the plate and the power supply, means intermediate the cathode and the power supply return for maintaining a potential differential between the cathode and such power supply return, means connected with the cathode and such power supply return for applying to the grid a potential intermediate that of the cathode and such power supply return and means whereby the electrical value of an outside element can be caused to control the potential at the grid relative to the potential of the cathode and the potential of such power supply return.

7. A structure as specified in claim 6, in which the power supply is adapted to deliver direct current and the cathode is connected to the negative power supply return through a resistance, and which includes means whereby such outside element may be inserted in one leg of a potentiometer arrangement of which one leg is connected to the cathode and the other leg to the negative power supply return.

8. A structure as specified in claim 6, in which the power supply is adapted to deliver alternating current and in which connections are provided between the grid and the cathode and also between the grid and such power supply return, which connections include means for inserting such outside element in one of such connections and for including a means of determinable value for causing a potential drop in the other of such connections.

9. A structure as specified in claim 6, which further includes means for varying the potential applied to the plate circuit without varying the potential of the primary power supply.

10. In combination, an electron tube and cathode plate and grid, a plate circuit therefor comprising an electrically responsive device, means for causing the potential at the cathode to be substantially positive relative to the negative return of the power supply, means for applying to the grid from such cathode circuit potential which is positive relative to the power supply return and means whereby the electrical value of an outside element can be caused to control the proportion of such positive potential applied to the grid.

11. In combination, an electron tube with cathode plate and grid, a plate circuit therefor comprising an electrically responsive device, a resistance intermediate the cathode and the cathode return of the power supply whereby a potential differential is maintained between the cathode and the cathode return to the power supply and means for applying to the grid potential intermediate that of the cathode and that of such power supply return comprising a potentiometer arrangement of which one leg is connected to said power supply return and one leg to the cathode and which comprises means for including in one of said potentiometer legs an element of determinable electrical value whereby the response of said electrically responsive device will be a function of the electrical value of such element.

12. In combination, an electron tube with cathode plate and grid, a plate circuit therefor comprising an electrically responsive device, a resistance intermediate the cathode and the negative power supply return, connections between such negative power supply return and the grid, said electrically responsive device being adapted to give a substantially negative indication when the grid is at the potential of the negative power supply return and means for varying the potential of the grid and thereby varying the flow of current in the plate circuit comprising a resistance in the grid circuit, and means for forming a circuit between the cathode and the grid through an outside element having an electrical value bearing a determinable relationship to said electrically responsive device.

13. An electric measuring device comprising in combination an electric tube having cathode, plate and grid, a source of direct current, a plate circuit comprising an ammeter connected to the power supply, a cathode circuit comprising a resistor interposed between the cathode and the negative power supply return, connections from the ends of such resistor adapted to be connected to the grid, means for inserting a resistance of known value in one of such connections, terminals in the other such connection between which an outside element having an electrical value to be determined is adapted to be inserted, and means for adjusting the readings of said ammeter such that its range of readings is approximately covered by a change in resistance between said terminals ranging from substantially zero to open circuit conditions.

GEORGE K. GRAHAM.